(12) United States Patent
French (10) Patent No.: US 6,955,371 B2
(45) Date of Patent: Oct. 18, 2005

(54) CLAMPING STEM

(75) Inventor: George French, Sheffield (GB)

(73) Assignee: Bear Corporation, Cerritos, CA (US)

( * ) Notice: Subject to any disclaimer, the term of this patent is extended or adjusted under 35 U.S.C. 154(b) by 131 days.

(21) Appl. No.: 10/713,707

(22) Filed: Nov. 17, 2003

(65) Prior Publication Data

US 2004/0183273 A1 Sep. 23, 2004

(51) Int. Cl.$^7$ .............................................. B62K 21/12
(52) U.S. Cl. ..................................... 280/279; 74/551.1
(58) Field of Search ................................ 280/279, 280; 74/551.1, 551.3, 551.4, 551.6, 551.7; 403/191

(56) References Cited

U.S. PATENT DOCUMENTS

| | | | |
|---|---|---|---|
| 568,082 A | 2/1896 | Barnes, Sr. | |
| 580,386 A | 4/1897 | Ehrman | |
| 1,263,249 A | * 4/1918 | Hoppes | 403/174 |
| 4,167,352 A | 9/1979 | Pletscher | |
| 4,310,260 A | 1/1982 | Katayama | |
| 4,484,832 A | 11/1984 | Weissenberger | |
| 4,501,435 A | * 2/1985 | McMurtrey | 280/279 |
| D285,295 S | 8/1986 | Kirkpatrick | |
| 4,676,120 A | 6/1987 | Borromeo | |
| 5,299,467 A | * 4/1994 | Marui | 74/551.1 |
| 5,437,208 A | 8/1995 | Cheng | |
| 5,442,973 A | 8/1995 | Liao | |
| 5,477,747 A | 12/1995 | Cheng | |
| 5,865,069 A | 2/1999 | Edwards | |
| 6,192,773 B1 | 2/2001 | Liao | |

OTHER PUBLICATIONS

Dan's Competition, Mail Order Catalog, Summer 2003, p. 66 Especially, Profile HIP and Bizhouse Dialyser.

* cited by examiner

Primary Examiner—Anne Marie Boehler
(74) Attorney, Agent, or Firm—Charles H. Thomas (57) ABSTRACT

A clamping stem is provided for concurrently securing a bicycle fork frame steering tube and a bicycle handlebar together. The clamping stem has a mounting bracket formed as a U-shaped structure with a pair of opposing mutually parallel legs with coaxial openings defined through the legs near the free ends thereof. A steering tube saddle block having a vertically oriented concave surface is disposed between the mounting bracket legs facing the steering tube openings therein. A handlebar saddle block having a horizontally oriented concave surface faces the concave surface of the mounting bracket yoke. A steering tube fits through the apertures in the mounting bracket legs while the handlebar fits through the space located between the mounting bracket yoke and the curved surface of the handlebar saddle block. The sides of the saddle blocks facing each other are formed with inclined surfaces that meet at apices centered between the lateral edges of the mounting bracket legs. A pair of opposing wedges having coaxially aligned openings therethrough are positioned between the saddle blocks. A bolt seated against the outer, wide end of one of the wedges is engaged with a threaded through bolt opening or a nut set in the other wedge. Advancement of the bolt draws the wedges toward each other, thereby forcing the saddle blocks apart and concurrently clamping them against the steering tube and handlebar.

10 Claims, 7 Drawing Sheets

CLAMPING STEM

BACKGROUND OF THE INVENTION

1. Field of the Invention

The present invention relates generally to a bicycle clamping stem which is a structure for fastening a bicycle handlebar to a bicycle fork steering tube of the bicycle front frame.

2. Description of the Prior Art

A bicycle front frame of the prior art utilizes a clamping structure for fastening a bicycle fork steering tube and a handlebar of the bicycle. The prior art clamping stem structure is provided at two ends with a plurality of fastening holes by which the front fork steering tube and a handlebar of a bicycle are respectively fastened together with the clamping structure. In the most commercially popular handlebar clamping stems a generally block-shaped structure is formed having a pair of rearwardly extending arms that define a generally cylindrical, nearly vertical opening therebetween. The distal extremities of the arms have a slight degree of resiliency and are drawn together by a pair of bolts.

In the forward portion of the structure a transverse, generally horizontal, semicylindrical groove is formed. A front end cap has a corresponding semicylindrical groove in its rear side and is attached to the forward portion of the block-shaped structure by four bolts. The clamping stem can thereby be attached by inserting the fork steering tube through the generally vertical, cylindrical opening formed in the clamping stem and tightening the bolts at the distal, rearward extremities of the arms. The front end cap is removed so that the center of the handlebar structure is seated in the transverse, semicylindrical groove formed in the front face of the clamping stem block. The front end cap is then attached to the front end face of the clamping stem block by bolts that are tightened to rigidly secure the handlebar in position.

In such conventional clamping stem structures it is not possible to concurrently secure the steering tube and the handlebars at the same time. Such prior structures are therefore inefficient at best, and are not cost-effective.

Another prior clamping stem system is commercially available and is sold as the Bizhouse Dializer model No. 26-370019. This clamping stem arrangement is formed of three configured component pieces, the central one of which is shaped to form a surface of contact for the fork steering tube on one side and a surface of contact for the handlebar on the other side. Four clamping bolts are utilized to tighten the three configured component pieces toward each other to concurrently clamp the handlebar and the fork steering tube at the same time. However, like the other conventional prior art devices, it is necessary to tighten four different bolts separately in order to clamp the component parts together.

SUMMARY OF THE INVENTION

A primary objective of the present invention is to provide an efficient and cost-effective clamping stem structure for fastening the handlebar of a bicycle to a bicycle front wheel fork steering tube. By utilizing the unique clamping stem of the invention the fork steering tube and the bicycle handlebar are secured together at the same time and utilizing only a single clamping bolt.

A further advantage of the present invention, as compared with conventional clamping stems, is that a clamping stem constructed according to the present invention weighs only about half as much as conventional clamping stems.

In keeping with the principles of the present invention, the foregoing object and advantage of the invention are achieved by a structure comprising a U-shaped frame for retaining the fork steering tube in a fork steering tube rest, and for retaining the handlebar in a handlebar rest. The frame has a pair of generally horizontally oriented, vertically aligned legs with coaxial, vertically aligned, circular openings defined therethrough. Two press blocks, or saddle blocks are movably located between the fork rest and the handlebar rest such that the two press blocks or saddle blocks can be tightened at the same time by a single bolt to move toward each other.

The handlebar saddle block is formed with a generally semicylindrical, transversely extending groove in its front face, and with a pair of inclined surfaces on its rear face. The inclined surfaces meet at an apex at the transverse center of the handlebar saddle block. The handlebar structure of the bicycle fits into the generally cylindrical seat formed between the semicylindrical, concave, rearwardly facing surface of the U-shaped mounting bracket and the corresponding forwardly facing semicylindrical surface of the handlebar saddle block.

The clamping stem of the invention is further comprised of a steering tube saddle block that has an arcuate, upright, generally semicylindrical groove formed in its rear face. This groove bears against the front surface of the front fork steering tube. The steering tube saddle block is formed with a pair of inclined surfaces on its forwardly facing side that converge at an apex at the transverse center of the steering tube saddle block.

A first wedge with an internally threaded bore therethrough and a second wedge with a smooth walled, countersunk bore therethrough are provided. Both wedges have a shape generally in the form of a trapezoidal prism when viewed from above or below. A bolt is provided that has a head that seats into the countersunk second wedge and a shank that threadably engages the internally tapped bore of the first wedge. Smooth, steel slide plates may be provided to conform to the inclined surfaces of both the saddle blocks and the wedges.

Once the handlebar is in position and a steering tube has been inserted through the circular openings in the legs of the U-shaped mounting bracket, the handlebar saddle block and the steering tube saddle block are then inserted into the gap that exists between the steering tube and the handlebar and are positioned so that their concave surfaces conform to the corresponding surfaces of the fork steering tube and the handlebar. If steel slide plates are employed, they are then inserted to reside in contact with the saddle blocks.

The wedges are then inserted into the gap between the saddle blocks with the steel slide plates, if employed, interposed therebetween. The bolt is then inserted through the countersunk second wedge and screwed into the internally threaded first wedge. The bolt is advanced, thereby drawing the countersunk second wedge and the first wedge together, thus urging the handlebar saddle block and the steering tube saddle block apart from each other and into tight, clamping engagement against the handlebar and the fork steering tube, respectively. As a result, the bicycle fork steering tube and the handlebar are simultaneously fastened together by the clamping stem of the invention as the single bolt is tightened up.

In one broad aspect the invention may be considered to be a clamp for fastening a bicycle handlebar to a bicycle steering tube. The clamp is comprised of a mounting bracket formed as a clevis having a pair of flat, mutually parallel legs emanating from a yoke, thereby defining a receiving space between the legs and within the yoke, and the yoke is formed with a concave inner surface that conforms in shape to the outer surface of the handlebar. Coaxially aligned apertures are defined through the legs remote from the yoke. These apertures are configured to conform to the shape of the outer surface of the steering tube and to receive the steering tube therethrough. The clamp is further comprised of a steering tube saddle block, a handlebar saddle block, first and second wedges, and a fastening bolt. The steering tube saddle block has opposing ends and a concave face directed away from the yoke and an opposite wedging face directed toward the yoke. The wedging face has opposing wedging surfaces inclined toward the yoke from the opposing ends of the steering tube saddle block. The handlebar saddle block is located within the receiving space proximate the yoke. The handlebar saddle block has opposing ends and a concave face directed toward the yoke and an opposite wedging face directed away from the yoke. The wedging face has opposing wedging surfaces inclined away from the yoke from the opposing ends of the handlebar saddle block.

The first and second wedges both have wide ends and narrow ends and are inserted into the receiving space between the saddle blocks with their narrow ends directed toward each other. The first and second wedges have inclined surfaces that are oriented perpendicular to the mounting bracket legs. The inclined surfaces of the wedges reside in face-to-face orientation with and are complementary to the inclined surfaces of the saddle blocks.

The wedges both have coaxially aligned fastening bolt bores that extend through their structures from end to and. The fastening bolt has a head seated at the wide end of the second wedge and a shank extending through the smaller diameter portion of the stepped bore in the second wedge and into the bore of the first wedge. The fastening bolt is engageable with the first wedge to draw the wedges toward each other thereby concurrently forcing both of the saddle blocks away from each other and into clamping engagement with the steering tube and the handlebar.

Preferably, both of the wedges have identical outer surface configurations and both wedges are configured in the shape of trapezoidal prism. It is sometimes advantageous to interpose smooth low friction slide plates between the wedges and the saddle blocks. This facilitates the advancement of the wedges toward each other and into clamping engagement relative to the bicycle fork steering tube and the bicycle handlebars.

Preferably, the concave surfaces of both of the saddle blocks are both shaped as semicylindrical, arcuate sectors. Preferably also the inclined surfaces of each of the saddle blocks meet each other at an obtuse angle thereby forming apices that are oriented perpendicular to the legs of the mounting bracket clevis. The mounting bracket legs have parallel opposing lateral edges. The apices formed on the saddle blocks are preferably centered laterally between the opposing lateral edges of the legs.

In another aspect the invention may be considered to be a clamp for securing a bicycle handlebar to a bicycle fork steering tube comprising: a U-shaped mounting bracket, a steering tube saddle block, a handlebar saddle block, first and second wedges, and a fastening bolt.

The mounting bracket has a pair of mutually parallel opposing legs and a central yoke located therebetween defining a receiving space between the legs and the yoke. Coaxially aligned identical circular apertures are defined through the mounting bracket legs. These apertures are both of a size and shape to conform to the outer cross-sectional shape of the cylindrical fork steering tube. The apertures in the mounting bracket legs receive the fork steering tube therethrough.

The steering tube saddle block fits into the receiving space adjacent the apertures in the legs. The steering tube saddle block has opposing extremities and a concave seating surface facing away from the yoke. The steering tube saddle block has a pair of opposing inclined surfaces oriented perpendicular to the mounting bracket legs and both inclined in a direction toward the yoke from the extremities of the steering tube saddle block.

The handlebar saddle block fits into the receiving space proximate the yoke. The handlebar saddle block has opposing extremities and a concave seating surface facing toward the yoke. The concave seating surface of the handlebar saddle block is also a semicylindrical surface, but is transversely oriented. The concave surfaces of the handlebar saddle block conforms to the outer surface of the center of the handlebar. The handlebar saddle block has a pair of opposing inclined surfaces oriented perpendicular to the mounting bracket legs and both inclined in a direction away from the yoke from the extremities of the steering tube saddle block.

The first and second wedges both have inclined surfaces that match the inclined surfaces of the saddle blocks. Both the first and second wedges have wide ends and narrow ends. The wedges fit into the receiving space between the saddle blocks from opposing sides of the U-shaped mounting bracket. The narrow ends of the wedges face each other.

The first wedge has an internally tapped bore therewithin with a clamping screw in the opening in the narrow end of the wedge. The second wedge has a stepped through hole bore extending between the ends of the second wedge. The through hole bore is smaller in area at the narrow end of the second wedge than at the wide end thereof. The through hole bore is coaxially aligned with the tapped bore in the first wedge.

The fastening bolt has a head and an externally threaded shank. The shank of the fastening bolt extends entirely through the through hole of the second wedge and is threadably engaged in the internally tapped bore of the first wedge. As a result, advancement of the bolt shank within the wedges draws the wedges toward each other forcing the saddle blocks toward opposing ends of the mounting bracket to thereby clamp the steering tube saddle block against the steering tube and concurrently clamp the handlebar saddle block against the handlebar. This immobilizes the steering tube and handlebar relative to each other.

The features and the advantages of the present invention will be more readily understood upon a thoughtful deliberation of the following detailed description of a preferred embodiment of the invention. The invention may be described with greater clarity and particularity by reference to the accompanying drawings.

DESCRIPTION OF THE EMBODIMENTS

Figure 1:
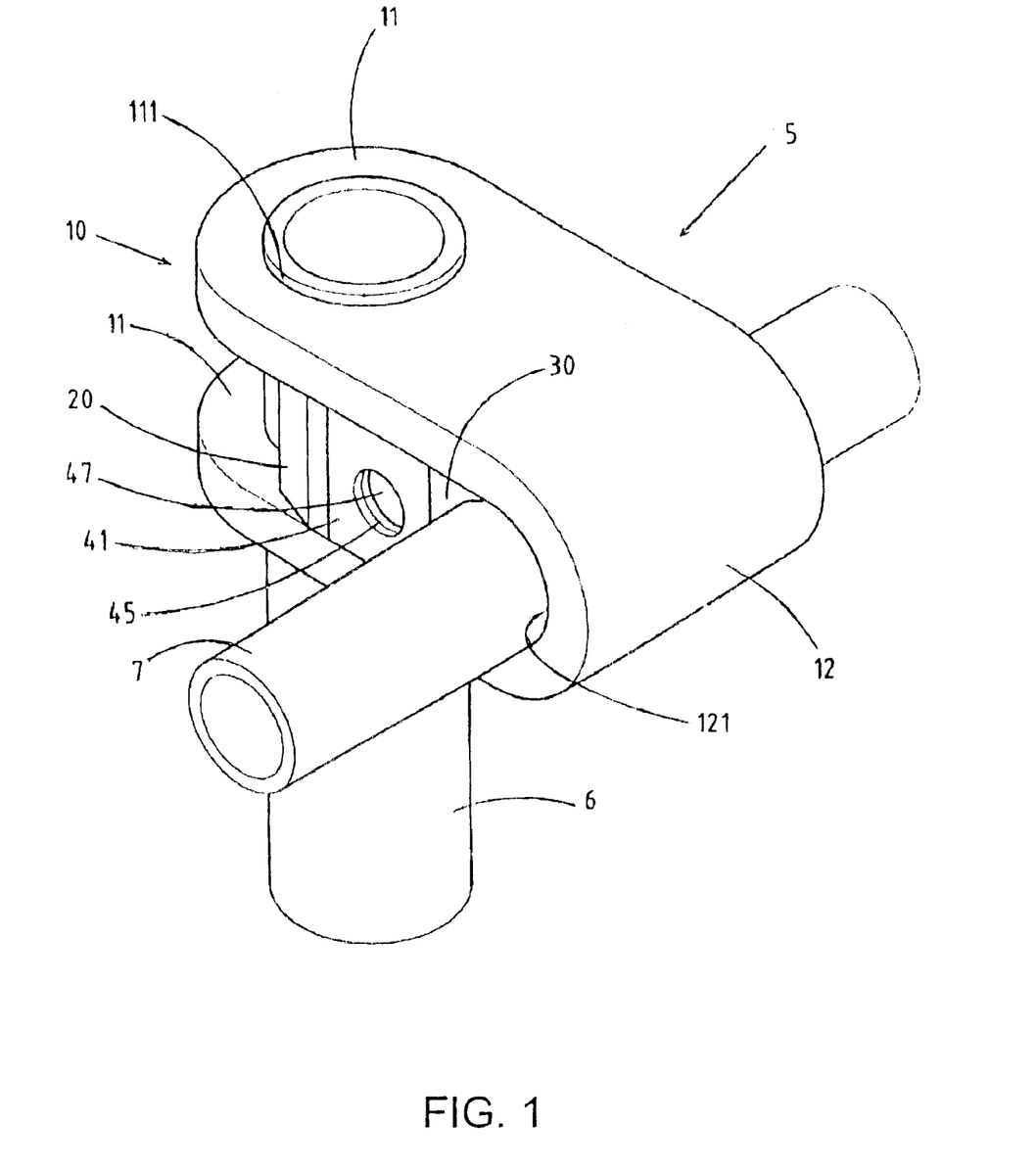
FIG. 1 is a perspective view of one preferred embodiment of the invention shown in an assembled condition and used with a bicycle front fork steering tube and bicycle handlebar.
Figure 2:
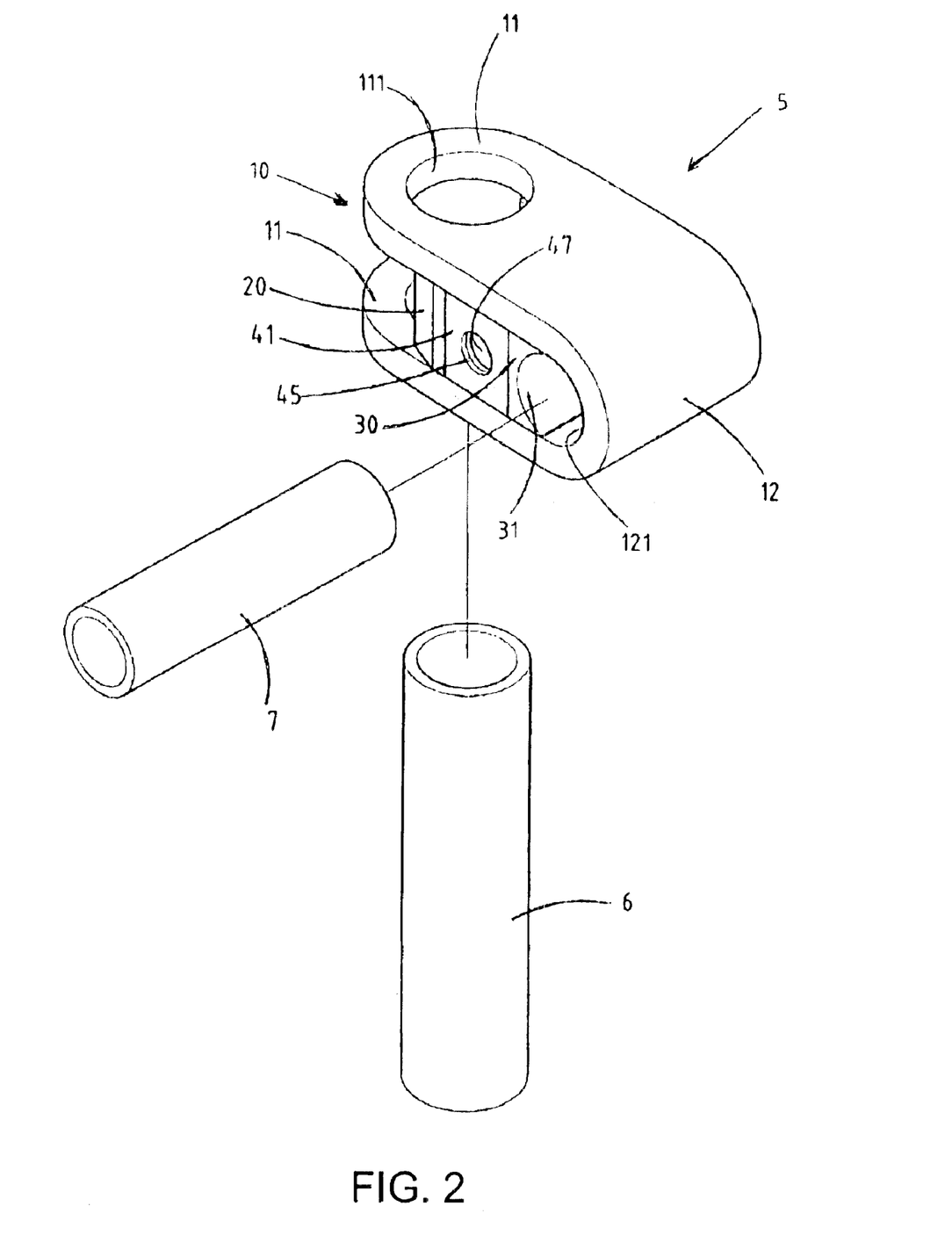
FIG. 2 is a partially exploded view showing separately a proper relationship of the clamping stem of the invention and the fork steering tube and bicycle handlebar of the preferred embodiment of the present invention.
Figure 3:
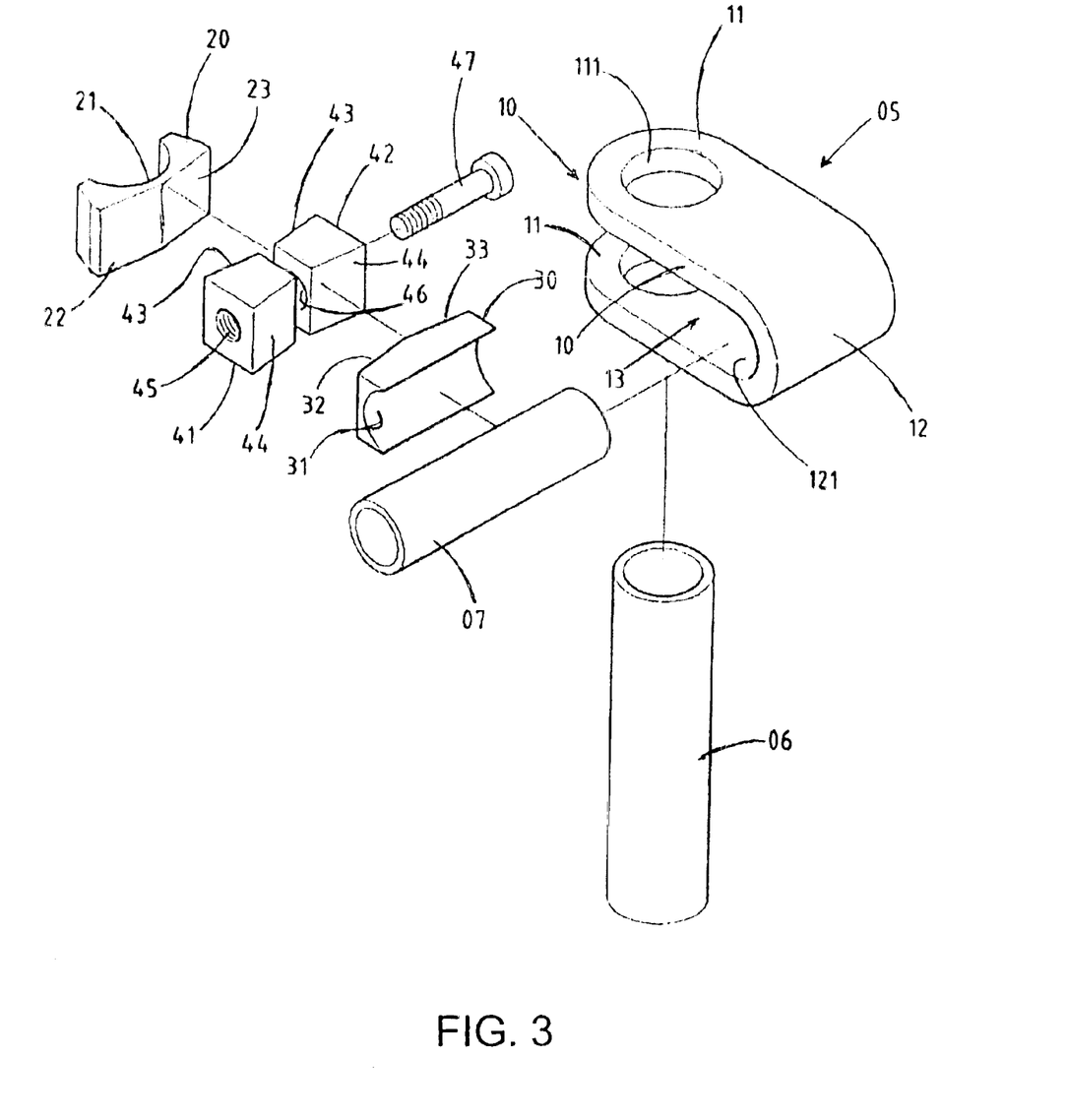
FIG. 3 is an exploded view of the preferred embodiment of the invention.

FIG. 1 illustrates a clamping stem 5 constructed according to the present invention which is used to fasten a bicycle front fork steering tube 6 and a bicycle handlebar 7 to each other. As shown in FIG. 3, the clamping stem 5 is comprised of a U-shaped frame or mounting bracket 10, a steering tube rest or saddle block 20, a handlebar rest or saddle block 30, a first press block or wedge 41, a second press block or wedge 42 and a fastening bolt 47.

The U-shaped mounting frame or mounting bracket 10 has two flat, mutually parallel legs 11 which are spaced apart from each other and joined together at one end to form a crown portion or yoke 12. The two legs 11 are both provided with a through hole or aperture 111 in proximity of their free ends and remote from the yoke 12. The through holes 111 are coaxially aligned with each other and are dimensioned to allow the passage of the fork steering tube 6. Each of the holes 111 is just slightly larger in diameter than the fork steering tube 6.

The concave inner wall 121 of the yoke portion 12 is transversely oriented and has a semicylindrical curvature with a diameter just larger than the handlebar 7 so as to snugly accommodate the handlebar 7. The mounting bracket 5 defines between the two legs 11 a receiving space 13 in which the steering tube rest or saddle block 20 is positioned adjacent to the through holes or apertures 111 and the steering tube 6. The steering tube saddle block 20 has a generally vertically extending concave seating surface 21 with a curvature that matches the curvature of the outer surface of the steering tube 6. The steering tube 6 is inserted through the two through holes 111 of the mounting bracket 10. The concave surface 21 of the steering tube saddle block 20 faces away from the yoke 12 and is located remote therefrom. The steering tube saddle block 20 is disposed in the receiving space 13 between the legs 11 of the mounting bracket 10 in such a manner that the curved surface 21 of the steering tube saddle block 20 resides in contact with the facing, curved, convex, vertically extending surface of the steering tube 6.

A pair of opposing, inclined surfaces 22 and 23 are formed on the side of the steering tube saddle block 20 opposite the semicylindrical surface 21 thereof. The inclined surfaces 22 and 23 are vertical, planar surfaces oriented perpendicular to the parallel mounting bracket legs 11 and meet each other at an apex to form an obtuse angle, of between about 155 and about 175 degrees. This angle is preferably about 158 degrees. The apex between the inclined surfaces 22 and 23 resides centered beneath the opposing, mutually parallel lateral edges of the mounting bracket legs 11.

The handlebar saddle block or rest 30 has a horizontally oriented, concave, forwardly facing curved semicylindrical surface 31 facing the yoke 12. On its opposite side the handlebar saddle block or rest 30 has a first sloping, inclined surface 32 and a second sloping, inclined surface 33 symmetrical to the first inclined surface 32. The inclined surfaces 32 and 33 of the handlebar saddle block 30 are both inclined in a direction away from the yoke 12 and toward the steering tube saddle block 20. The inclined surfaces 31 and 32 are also oriented perpendicular to the mutually facing surfaces of the legs 11 and meet at an apex midway between the mutually parallel lateral edges of the mounting bracket legs 11. The angle between the inclined surfaces 32 and 33 is the same obtuse angle as the angle between the inclined surfaces 22 and 23.

The handlebar saddle block 30 is disposed in the receiving space 13 of the mounting bracket 10 in such a manner that its concave semicylindrical curved surface 31 presses against the facing outer surface of the handlebar 7. The handlebar 7 is thereby sandwiched between the curved surface 121 of the mounting bracket 10 and the curved surface 31 of the handlebar saddle block 30.

The first and second press blocks or wedges 41 and 42 both have inclined surfaces 43 and 44 that respectively match the inclined surfaces 22 and 23 of the steering tube saddle block 20 and the inclined surfaces 32 and 33 of the handlebar saddle block 30. The first wedge 41 is provided on one side with a first sloping surface 43 symmetrical to the first sloping surface 22 of the steering tube saddle block 20, and on the other side with a second sloping surface 44 symmetrical to the first sloping surface 32 of the handlebar saddle block 30. The wedges 41 and 42 both have wide ends directed away from each other and narrow ends directed toward each other. The wedges 41 and 43 are both formed in the shape of trapezoidal prisms.

Figure 4:
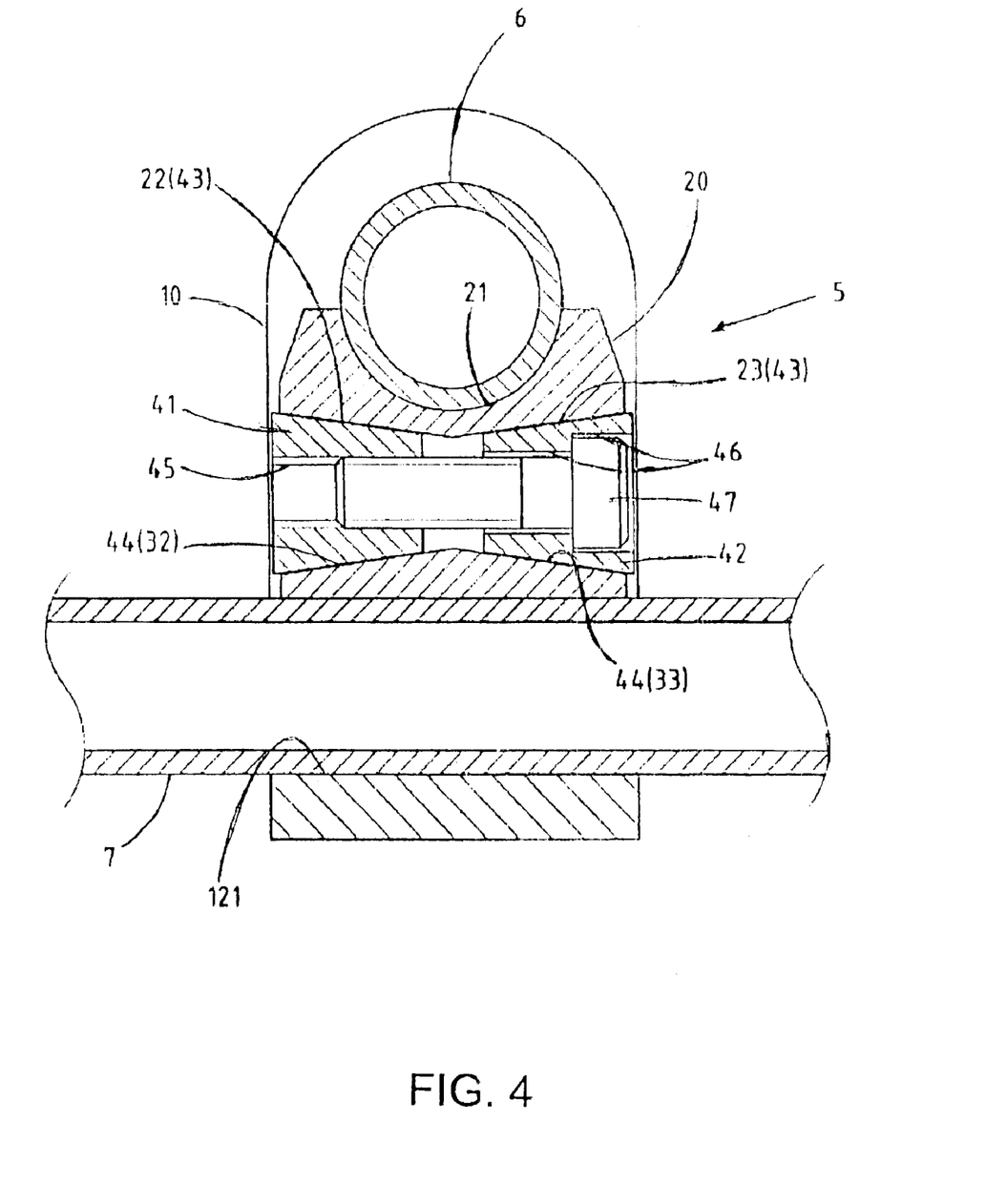
FIG. 4 is a plan sectional view illustrating the preferred embodiment of the invention prior to tightening the single clamping bolt.

The first wedge 41 is further provided with an internally tapped through hole or bore 45 defined therethrough with a clamping screw entry opening in the narrow end of the wedge 41. The first wedge 41 is disposed in the receiving space 13 of the mounting bracket 10 in such a way that the first wedge 41 is located between the steering tube saddle block 20 and the handlebar saddle block 30. The first sloping surface 43 of the first wedge 41 comes in contact with the first sloping surface 22 of the steering tube saddle block 20 as shown in FIG. 4. Similarly, the second sloping surface 44 of the first wedge 41 comes in contact with the first sloping surface 32 of the handlebar saddle block 30, also as shown in FIG. 4.

The second wedge 42 is provided on one side with a first sloping surface 43 symmetrical to the second sloping surface 23 of the steering tube saddle block 20. On the other side the second wedge 42 is provided with a second sloping surface 44 symmetrical to the second sloping surface 33 of the handlebar saddle block 30.

The second wedge 42 is further provided with a stepped through hole bore 46, the surfaces of which are smooth. The bore 46 has a stepped cylindrical shape. The second wedge 42 is disposed in the receiving space 13 of the mounting bracket 10 in such a way that the second wedge 42 is located between the steering tube saddle block 20 and handlebar saddle block 30. The second wedge 42 is in an opposite location to the first wedge 41. That is, the wedges 41 and 42 are oriented with their narrow ends facing each other as illustrated in the drawing figures.

The stepped through hole 46 of the second wedge 42 is coaxially aligned with the threaded through hole 45 of the first wedge 41. The first sloping surface 43 of the second wedge 42 comes in contact with the second sloping surface 23 of the steering tube saddle block 20. The second sloping surface 44 of the second wedge 42 comes in contact with the second sloping surface 33 of the handlebar saddle block 30. It is important to note that there is a spaced distance of separation between the narrow end of the first wedge 41 and the narrow end of the second wedge 42.

Figure 5:
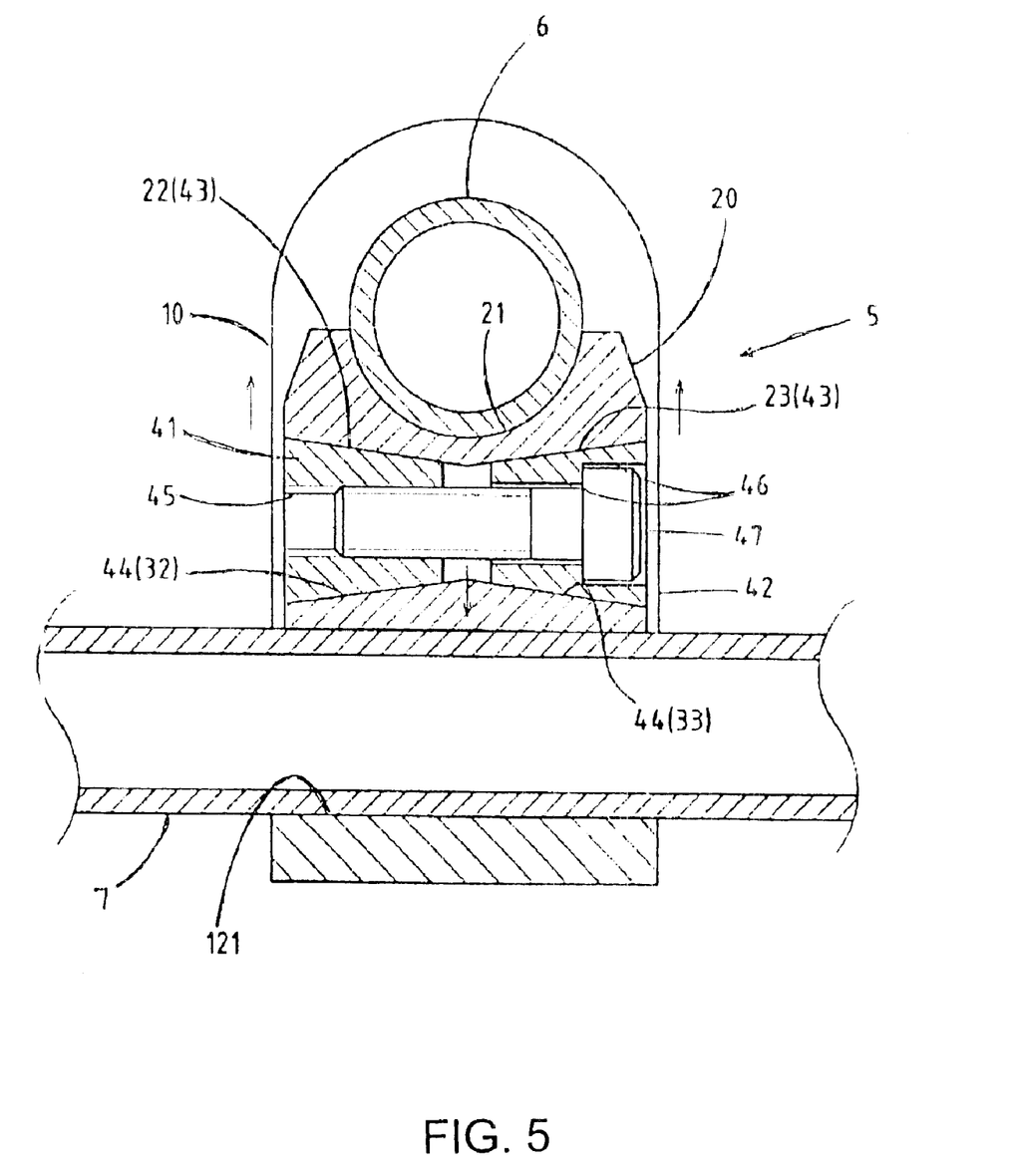
FIG. 5 is a plan sectional view showing the preferred embodiment of the present invention in a clamped condition.

To secure the handlebar 7 to the steering tube 6 the component parts of the clamping stem 5 are arranged together as illustrated in FIG. 4 with the steering tube 6 and the handlebar 7 in position adjacent to their respective saddle blocks as illustrated. The fastening bolt 47 is then inserted through the stepped through hole 46 of the second wedge 42 so as to engage the threaded through hole 45 of the first wedge 41. As the fastening bolt 47 is tightened, the two wedges 41 and 42 are forced toward each other, as illustrated in FIG. 5. Concurrently, the first sloping surface 43 of the first wedge 41 and the second wedge 42 are forced to press respectively against the first sloping surface 22 and the second sloping surface 23 of the steering tube saddle block 20. This action forces the concave surface 21 of the steering tube saddle block 20 to press against the outer surface of the steering tube 6, as shown in FIG. 5.

Similarly, the second sloping surfaces 44 of the first wedge 41 and the second wedge 42 are forced by the advancement of the bolt 47 to press respectively against the first sloping surface 32 and the second sloping surface 33 of the handlebar saddle block 30. This causes the curved surface 31 of the handlebar saddle block 30 to exert pressure on the handlebar 30 which is securely held between the curved surface 31 of the handlebar saddle block 30 and the opposing curved surface 121 of the yoke 12 of the mounting bracket 10.

Figure 6:
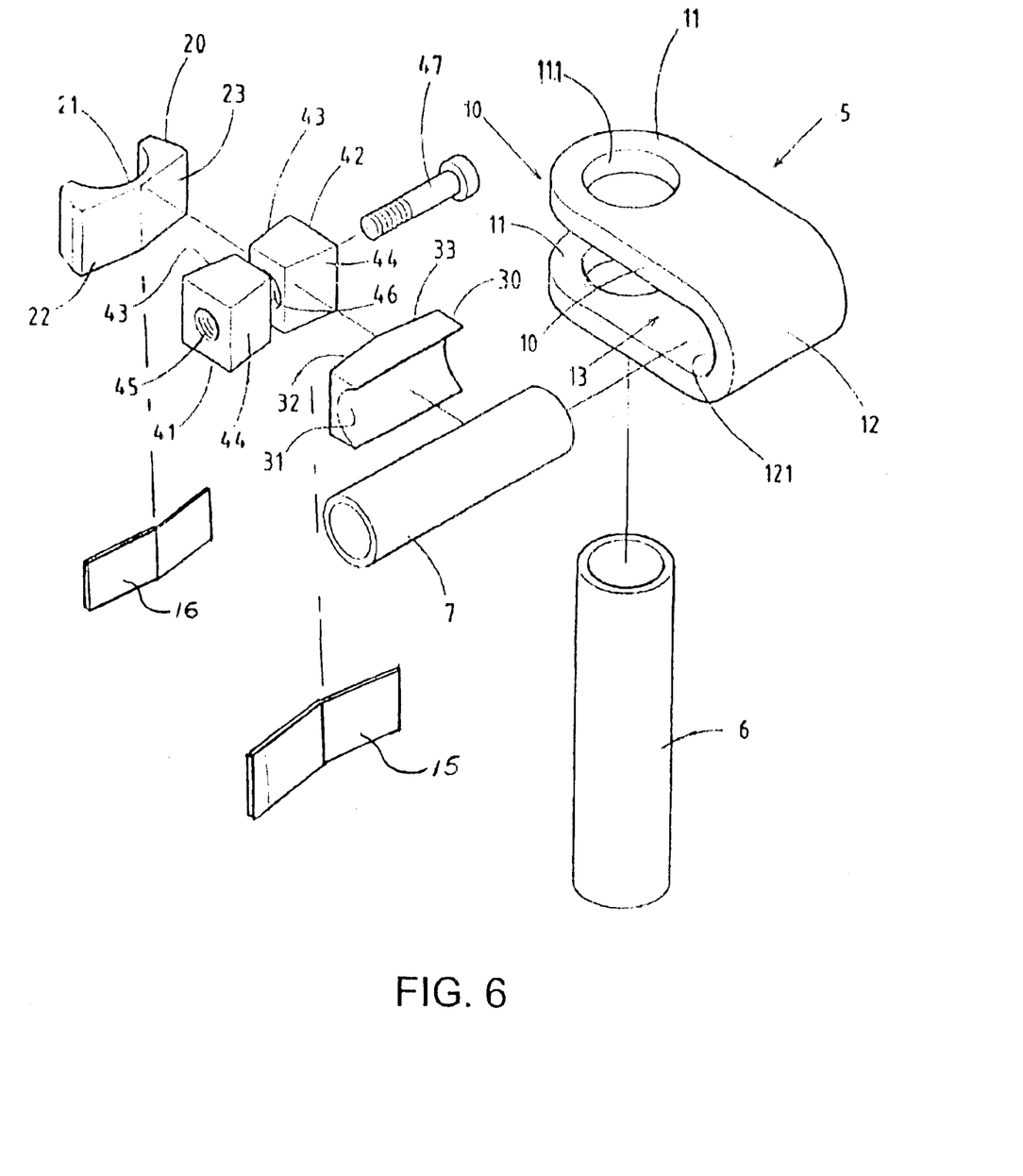
FIG. 6 is a perspective view illustrating a modification to the clamping stem of the invention shown in FIG. 3.

FIG. 6 illustrates a modification of the invention in which a pair of low friction slip plates 15 and 16 are interposed between the saddle blocks and the wedges 41 and 42. Specifically, the slip plate 15 is interposed between the steering tube saddle block 20 and the wedges 41 and 42, while the slip plate 16 is interposed between the handlebar saddle block 30 and the wedges 41 and 42. The use of the low friction slip plates 15 and 16 is optional, but does sometimes smooth the advance of the wedges 41 and 42 toward each other while the bolt 47 is tightened.

Each of the slip plates 15 and 16 is formed of a smooth, thin, rigid, rectangular plate of low friction material, such as stainless steel. The slip plates 15 and 16 are each bent at their centers to form a dihedral structure with the surfaces facing the saddle blocks forming an obtuse angle equal to the obtuse angle between the inclined surfaces of the saddle blocks 20 and 30. Because the slip plates 15 and 16 have surfaces that meet at an obtuse angle, they will remain centered between the lateral edges of the mounting bracket arms 11, and will not slide out from between the wedges 41 and 42 and the saddle blocks 20 and 30.

Figure 7:
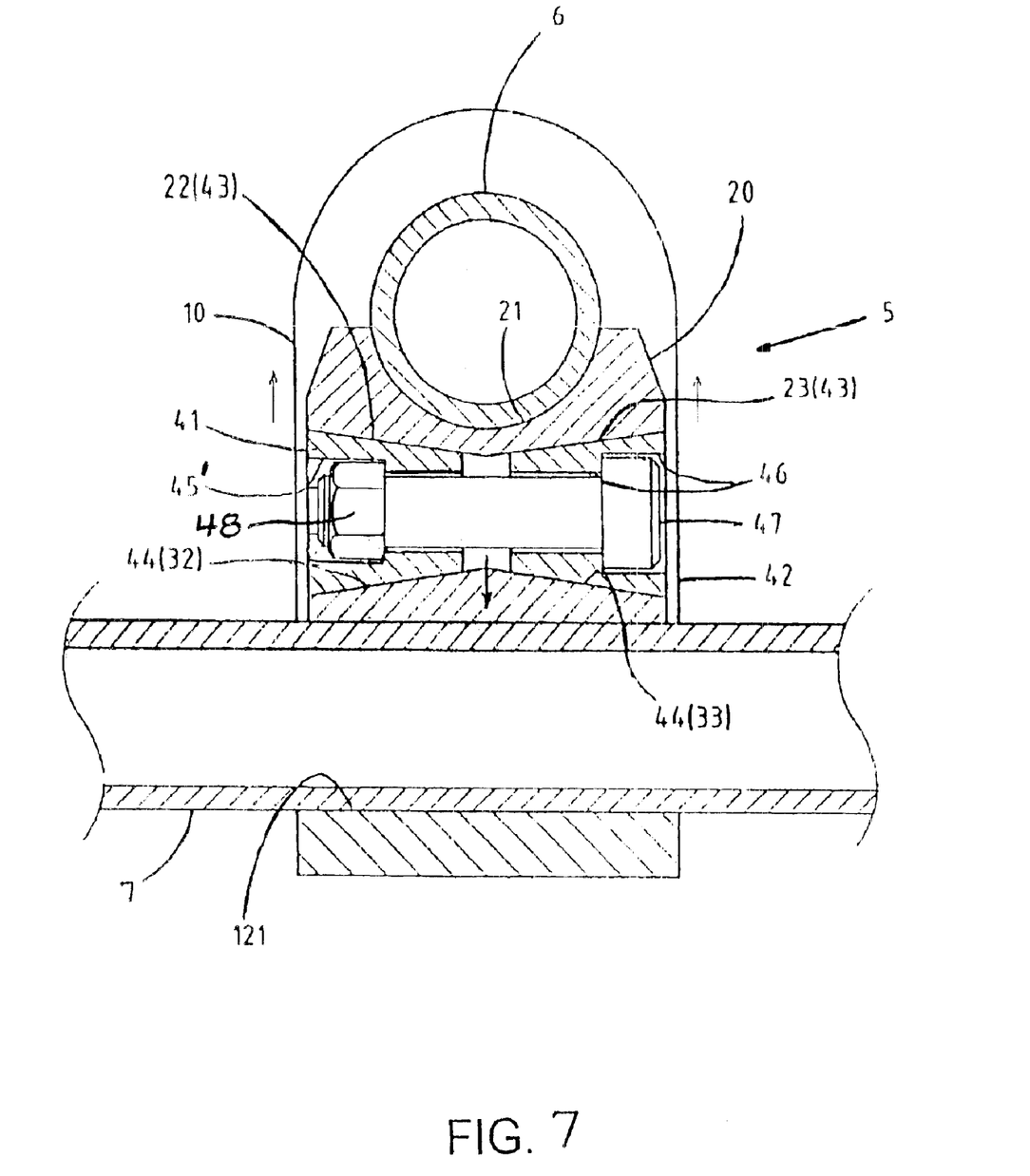
FIG. 7 is a sectional view illustrating another alternative embodiment of the invention.

FIG. 7 illustrates another embodiment of the invention in which the bore 45' is not internally tapped, but rather is a stepped bore. The bore 45' is formed with a smooth walled, cylindrical portion facing the second wedge 43 and a larger, end recess of hexagonal shape configured with a tolerance just large enough to receive a nut 48 having a hexagonal shape. The shank of the bolt 47 passes through the cylindrical portions of the through hole bores 46 and 45' and is engaged with the nut 48 which cannot turn when it is seated in the enlarged, hexagonal, end recess of the through hole bore 45'.

It is therefore readily apparent that the steering tube 6 and the handlebar 7 of a bicycle can be simultaneously fastened to each other with ease and speed utilizing a single fastening bolt 47 in all of the embodiment of the invention. The clamping stem 5 of the present invention is therefore considerably more efficient and cost-effective than conventional prior art clamping stems, which call for the use of a plurality of fastening bolts. Moreover, conventional clamping stems are much heavier and are incapable of fastening the steering tube and the handlebar of a bicycle together at the same time by the use of a single bolt.

Undoubtedly, numerous variations and modifications of the invention will become readily apparent to those familiar with bicycle clamping stems. For example, although the wedges or press blocks of the invention are preferably provided with sloping surfaces on both sides having the same degree of taper, it is possible for the inclined surfaces of the handlebar saddle block and the corresponding facing surfaces of the first and second wedges to have one angular inclination, such as about 30 degrees, and for the inclined surfaces on the steering tube saddle block and the corresponding facing surfaces of the wedges to be inclined at a different angle, such as about 15 degrees. Also, the embodiment of the invention illustrated in FIG. 7 could be modified so that the nut 48 and/or the bolt 47 are located externally of the respective wedges 41 and 42. Accordingly, the scope of the invention should not be construed as limited to the specific embodiments depicted and described, but rather is defined in the claims appended hereto.

I claim:

1. A structure for fastening a steering tube and a handlebar of a bicycle to each other, said structure comprising:

a U-shaped frame having two parallel legs which are joined together at one end to form a crown portion and said legs are each provided in proximity of a free end thereof with a through hole dimensioned to allow the passage of said steering tube, said crown portion being provided with an inner wall having a curvature to accommodate a bicycle handlebar, said frame also being provided with a receiving space located between said two legs;

a steering tube rest having opposing sides and being provided on one of said opposing sides with a curvature to accommodate said steering tube, and being provided on the other of said opposing sides with a first sloping surface and a second sloping surface symmetrical to said first sloping surface, said steering tube rest being disposed in said receiving space of said frame in such a manner that said curvature of said steering tube rest comes in contact with said steering tube;

a handlebar rest having opposing sides and being provided on one of its opposing sides with a curvature to accommodate said handlebar, and being provided on the other of its sides with a first sloping surface and a second sloping surface symmetrical to said first sloping surface, said handlebar rest being disposed in said receiving space of said frame in such a manner that said curvature of said handlebar rest comes in contact with said handlebar;

a first press block provided with opposing sides and being provided on one of said opposing sides with a first sloping surface symmetrical to said first sloping surface of said steering tube rest, and being provided on said other of its opposing sides with a second sloping surface symmetrical to said first sloping surface of said handlebar rest, said first press block being further provided with a threaded through hole, whereby said first press block is disposed in said receiving space of said frame in such a manner that said first press block is located between said steering tube rest and said handlebar rest, and that said first sloping surface of said first press block comes in contact with said first sloping surface of said steering tube rest, and that said second sloping surface of said first press block comes in contact with said first sloping surface of said handlebar rest;

a second press block provided with opposing sides and having on one of its opposing sides a first sloping surface symmetrical to said second sloping surface of said steering tube rest, and on the other of its sides with a second sloping surface symmetrical to said second sloping surface of said handlebar rest, said second press block being further provided with a stepped through hole, whereby said second press block is disposed in said receiving space of said frame in such a manner that said second press block is located between said steering tube rest and said handlebar rest, and said second press block is separated from said first press block by a distance, and that said stepped through hole of said second press block is aligned with said threaded through hole of said first press block, and that said first sloping surface of said second press block comes in contact with said second sloping surface of said steering tube rest, and that said second sloping surface of said second press block comes in contact with said second sloping surface of said handlebar rest; and a fastening bolt engaging said threaded through hole of said first press block via said stepped through hole of said second press block, whereby said bolt is fastened with said threaded through hole when said first press block and said second press block move toward each other, thereby causing said first press block in said second press block to press against said steering tube rest and said handlebar rest.

2. A clamp for fastening a bicycle handlebar to a bicycle steering tube comprising:

a mounting bracket formed as a clevis having a pair of flat, mutually parallel legs and emanating from a yoke, thereby defining a receiving space between said legs and within said yoke, and said yoke is formed with a concave inner surface that conforms in shape to the outer surface of said handlebar, and coaxially aligned apertures are defined through said legs remote from said yoke and said apertures are configured to conform to the shape of the outer surface of said steering tube and to receive said steering tube therethrough, a steering tube saddle block located within said receiving space remote from said yoke and having opposing ends and a concave face directed away from said yoke and an opposite wedging face directed toward said yoke and wherein said wedging face has opposing wedging surfaces inclined toward said yoke from said opposing ends of said steering tube saddle block, a handlebar saddle block located within said receiving space proximate said yoke, and having opposing ends and a concave face directed toward said yoke and an opposite wedging face directed away from said yoke, and said wedging face has opposing wedging surfaces inclined away from said yoke from said opposing ends of said handlebar saddle block, first and second wedges both having wide ends and narrow ends and inserted into said receiving space between said saddle blocks with said narrow ends of said first and second wedges directed toward each other, and both of said wedges have inclined surfaces that are oriented perpendicular to said mounting bracket legs and said inclined surfaces of said wedges reside in face-to-face arrangement with said inclined surfaces of said saddle blocks and are complementary to said inclined surfaces of said saddle blocks, and said wedges both have coaxially aligned fastening bolt bores that extend therethrough from end to end, wherein said fastening bolt bore through said first wedge is internally tapped and said fastening bolt bore through said second wedge is stepped, and a fastening bolt having a head seated at said wide end of said second wedge and a shank extending through said bore in said second wedge and into said bore of said first wedge, and said fastening bolt is engageable to draw said wedges toward each other, thereby concurrently forcing both of said saddle blocks away from each other and into clamping engagement with said steering tube and said handlebar.

3. A clamp according to claim 2 wherein both of said wedges have identical outer surface configurations, and said wedges are both configured in the shape of trapezoidal prisms.

4. A clamp according to claim 2 further comprising smooth slide plates interposed between said wedges and said saddle blocks.

5. A clamp according to claim 2 wherein said inclined surfaces of each of said saddle blocks meet each other, thereby forming apices that are oriented perpendicular to said legs of said clevis.

6. A clamp according to claim 5 wherein said legs of said mounting bracket have parallel opposing lateral edges and said apices of said saddle blocks are centered laterally between said opposing lateral edges of said legs.

7. A clamp according to claim 2 wherein said concave surfaces of both of said saddle blocks are shaped as semicylindrical, arcuate sectors.

8. A clamping stem for fastening a bicycle handlebar to a bicycle steering tube comprising:

a U-shaped mounting bracket having a pair of flat, mutually parallel opposing legs and a central yoke located therebetween, thereby defining a receiving space between said legs and said yoke, and coaxially aligned identical apertures are defined through said mounting bracket legs and said apertures are both of a size and shape to conform to the outer cross-sectional shape of said steering tube and said apertures receive said steering tube therethrough, a steering tube saddle block that fits into said receiving space adjacent said apertures in said legs, and said steering tube saddle block has opposing extremities and a concave seating surface facing away from said yoke and a pair of opposing inclined surfaces oriented perpendicular to said legs and both inclined in a direction toward said yoke from said extremities of said steering tube saddle block, a handlebar saddle block that fits into said receiving space proximate said yoke, and said handlebar saddle block has opposing extremities and a concave seating surface facing toward said yoke and having a size and shape to conform to the surface of said handlebar, and said handlebar saddle block has a pair of opposing inclined surfaces oriented perpendicular to said legs and both inclined in a direction away from said yoke from said extremities of said steering tube saddle block, first and second wedges both having inclined surfaces that match said inclined surfaces of said saddle blocks, and both having wide ends and narrow ends, and said wedges fit into said receiving space between said saddle blocks from opposing sides of said U-shaped mounting bracket with said narrow ends of said wedges facing each other, and said first wedge has an internally tapped bore therewithin with a clamping screw entry opening in said narrow end of said wedge, and said second wedge has a stepped through hole bore extending between said ends of said second wedge, and said through hole bore is smaller in area at said narrow end of said second wedge than at said wide end thereof, and said through hole bore is coaxially aligned with said bore in said first wedge, and a fastening bolt having a head and an externally threaded shank, whereby said shank of said fastening bolt extends entirely through said through hole bore of said second wedge and is threadably engaged in said internally tapped bore of said first wedge, whereby advancement of said bolt shank within said wedges drive said wedges toward each other, thereby forcing said saddle blocks toward opposing ends of said mounting bracket to thereby clamp said steering tube saddle block against said steering tube and clamp said handlebar saddle block against said handlebar, thereby immobilizing said steering tube and handlebar relative to each other.

9. A clamping stem for fastening a bicycle handlebar to a bicycle steering tube comprising:
- a U-shaped mounting bracket having a pair of flat, mutually parallel opposing legs and a central yoke located therebetween, thereby defining a receiving space between said legs and said yoke, and coaxially aligned identical apertures are defined through said mounting bracket legs and said apertures are both of a size and shape to conform to the outer cross-sectional shape of said steering tube and said apertures receive said steering tube therethrough,
- a steering tube saddle block that fits into said receiving space adjacent said apertures in said legs, and said steering tube saddle block has opposing extremities and a concave seating surface facing away from said yoke and a pair of opposing inclined surfaces oriented perpendicular to said legs and both inclined in a direction toward said yoke from said extremities of said steering tube saddle block,
- a handlebar saddle block that fits into said receiving space proximate said yoke, and said handlebar saddle block has opposing extremities and a concave seating surface facing toward said yoke and having a size and shape to conform to the surface of said handlebar, and said handlebar saddle block has a pair of opposing inclined surfaces oriented perpendicular to said legs and both inclined in a direction away from said yoke from said extremities of said steering tube saddle block,
- first and second wedges both having inclined surfaces that match said inclined surfaces of said saddle blocks, and both having wide ends and narrow ends, and said wedges fit into said receiving space between said saddle blocks from opposing sides of said U-shaped mounting bracket with said narrow ends of said wedges facing each other, and said first wedge has a through hole bore therewithin with a clamping screw entry opening in said narrow end of said wedge, and said second wedge has a stepped through hole bore extending between said ends of said second wedge, and said through hole bore of said second wedge is smaller in area at said narrow end of said second wedge than at said wide end thereof, and is coaxially aligned with said bore in said first wedge,
- a fastening bolt having a head and an externally threaded shank, and
- a nut engageable with said threaded shank of said fastening bolt,
- wherein said shank of said fastening bolt extends entirely through said through hole bore of said second wedge and into said bore of said first wedge, and is engaged with said nut at said wide end of said first wedge, whereby advancement of said bolt shank within said wedges drives said wedges toward each other, thereby forcing said saddle blocks toward opposing ends of said mounting bracket to thereby clamp said steering tube saddle block against said steering tube and clamp said handlebar saddle block against said handlebar, thereby immobilizing said steering tube and handlebar relative to each other.

10. A clamping stem according to claim 9 wherein said through hole bore in said first wedge is a stepped bore with a non-circular recess at said wide end of said first wedge, and said nut is set into said non-circular recess and thereby immobilized from rotation.

* * * * *